(12) United States Patent
Turtinen et al.

(10) Patent No.: US 11,006,447 B2
(45) Date of Patent: May 11, 2021

(54) RANDOM ACCESS FOR NR

(71) Applicant: Nokia Technologies Oy, Espoo (FI)

(72) Inventors: Samuli Heikki Turtinen, Ii (FI); Alois Herzog, Nantes (FR); Sheyam Lal Dhomeja, Espoo (FI); Juho Mikko Oskari Pirskanen, Kangasala (FI); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/343,666

(22) PCT Filed: Oct. 21, 2016

(86) PCT No.: PCT/EP2016/075393
§ 371 (c)(1),
(2) Date: Apr. 19, 2019

(87) PCT Pub. No.: WO2018/072844
PCT Pub. Date: Apr. 26, 2018

(65) Prior Publication Data
US 2020/0059959 A1 Feb. 20, 2020

(51) Int. Cl.
*H04W 74/02* (2009.01)
*H04W 74/00* (2009.01)

(52) U.S. Cl.
CPC ......... *H04W 74/02* (2013.01); *H04W 74/006* (2013.01)

(58) Field of Classification Search
CPC ..... H04L 5/001; H04L 1/1812; H04L 5/0098; H04L 1/188; H04L 5/0053; H04L 5/0055; H04L 1/1822; H04L 1/1861; H04L 1/1893; H04L 5/0023; H04L 5/0032; H04L 1/1628; H04L 1/18; H04L 1/1854; H04L 47/26; H04L 5/0001; H04L 5/0057; H04L 5/0087; H04L 5/0096; H04L 61/6022
See application file for complete search history.

(56) References Cited

U.S. PATENT DOCUMENTS

2012/0100864 A1* 4/2012 Susitaival ......... H04W 72/0446
455/450

FOREIGN PATENT DOCUMENTS

EP 3 079 271 A1 10/2016

OTHER PUBLICATIONS

Huawei et al., "Low latency and low overhead transmission for NR," 3rd Generation Partnership Project (3GPP), 3GPP TSG-RAN WG2 Meeting #93bis, R2-162662, XP051082246, 7 pages, Dubrovnik, Croatia, Apr. 11-15, 2016.
Samsung, "Random Access Procedure in NR," 3rd Generation Partnership Project (3GPP), 3GPP TSG-RAN WG2 95bis, R2-166065, XP051150687, 7 pages, Kaohsiung, Taiwan, Oct. 10-14, 2016.
Motorola, "RACH Procedure Cancellation," 3rd Generation Partnership Project (3GPP), 3GPP TSG-RAN2 Meeting #61, R2-081069, XP050138858, 1 page, Sorrento, Italy, Feb. 11-15, 2008.
International Search Report for PCT/EP2016/075393 dated Jul. 12, 2017.

* cited by examiner

*Primary Examiner* — Natasha W Cosme
(74) *Attorney, Agent, or Firm* — Fay Sharpe LLP

(57) ABSTRACT

There is provided a method comprising: determining that there are no uplink resources available for transmitting a Scheduling Request; initiating a timer in response to said determination; and if said timer expires, on expiry of said timer, initiating a random access procedure on the uplink.

21 Claims, 8 Drawing Sheets

RANDOM ACCESS FOR NR

FIELD OF THE INVENTION

This disclosure relates to a method and apparatus, and in particular but not exclusively to a method and apparatus relating to Scheduling Requests.

BACKGROUND

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or WiFi). Wi-Fi is often used synonymously with WLAN.

The wireless systems can be divided into cells, and are therefore often referred to as cellular systems. A user can access a communication system by means of an appropriate communication device or terminal. A communication device of a user is often referred to as user equipment (UE) or user apparatus. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. Further development of LTE are sometimes referred to as LTE Advanced (LTE-A). The various development stages of 3GPP specifications are referred to as releases. In this description 3GPP release versions are distinguished by acronym "Rel-nn".

In addition to LTE evolution, 3GPP has initiated a study item targeting a new radio generation (5G) called new radio (NR). NR does not require backwards compatibility with LTE. Instead, it aims at tight interworking between the RAT (radio access technology) and LTE. An objective of a NR study item is to identify and develop technology components needed for new radio (NR) systems to use any spectrum band ranging at least up to 100 GHz. The aim may be to achieve a single technical framework addressing usage scenarios, requirements and deployment scenarios defined in, for example, TR 38.913. The new radio access technology may be forward compatible to allow specification in two separate phases (Phase I and Phase II).

Rel-13 LTE LAA (Licensed Assisted Access) specifications are aimed to provide definitions for licensed-assisted access to unlicensed radio spectrum. The access is intended to coexist with other technologies and fulfil regulatory requirements. In Rel-13 LAA, unlicensed spectrum is utilized to improve LTE downlink (DL) throughput. Unlicensed band operation may need to be supported also by (5G) new radio. The 5G Technical Forum specifies new radio technology for higher frequencies (e.g. 28 GHz and above). In this forum, beamforming is used to compensate the huge path loss at higher frequencies.

SUMMARY

According to a first aspect there is provided a method comprising: determining that there are no uplink resources available for transmitting a Scheduling Request; initiating a timer in response to said determination; and if said timer expires, on expiry of said timer, initiating a random access procedure on the uplink.

The method may further comprise receiving an allocation of resources for an uplink channel prior to expiry of said timer and transmitting the Scheduling Request on said allocated resources.

The method may further comprise, on expiry of said timer, cancelling said Scheduling Request.

The method may further comprise, if said timer expires, on expiry of said timer, cancelling all of said Scheduling Requests that are currently pending.

The method may further comprise, prior to initiating said timer, receiving from a network apparatus configuration information for setting the length of the timer, and setting the length of the timer in response using the configuration information.

The method may further comprise configuring the timer to apply to a single logical channel or logical channel group.

Said timer may be configured to expire at the next opportunity for transmitting a random access preamble to a network apparatus.

The method may further comprise, initiating a time-alignment timer, wherein expiry of the time-alignment timer indicates that the network apparatus is no longer synchronised on the uplink with the apparatus initiating the timer-alignment timer, on expiry of said timer, determining whether the time-alignment timer has expired, and only performing said initiating of a random access procedure when it is determined that the time-alignment timer has not expired.

The method may further comprise initiating a timer in respect of each Scheduling Request to be transmitted, and on the first expiry of one of said timers, resetting the remainder of said timers and initiating random access procedures.

Said timer may be configured to expire on the next random access channel subframe to occur subsequent to initiation of said timer.

Said timer may be configured to expire on the next random access channel subframe to occur subsequent to initiation of said timer that is associated with one of: the serving beam; the beam having the best quality; a candidate beam; and/or a beam group.

Said timer may be configured in dependence on a window of time within which a user apparatus is configured to expect a network to assign uplink resources for transmitting a scheduling request.

The method may further comprise: receiving an allocation of resources for an uplink channel prior to expiry of said timer; and pausing said timer at the value of the timer when the resource allocation is received.

The method may further comprise: transmitting a Scheduling Request in the allocated resources; and resuming the count of the timer from the paused value of the timer.

The method may further comprise: transmitting a Scheduling Request in the allocated resources; and restarting the count of the timer from an initial value of the timer.

The method may further comprise: restarting and/or resuming the count of the timer when the Scheduling Request is transmitted; or restarting and/or resuming the count of the timer a predetermined time after transmitting the Scheduling Request.

According to a second aspect, there is provided a method comprising: determining, by a network apparatus, a timer value for delaying an initiation of a random access procedure at a user apparatus; and signalling, by the network apparatus, the timer value to the user apparatus.

The determining may be made aperiodically in dependence on network conditions within a preceding time period.

According to a third aspect there is provided an apparatus comprising: means for determining that there are no uplink resources available for transmitting a Scheduling Request; means for initiating a timer in response to said determination; and means for, if said timer expires, on expiry of said timer, initiating a random access procedure on the uplink.

The apparatus may further comprise means for receiving an allocation of resources for an uplink channel prior to expiry of said timer and means for transmitting the Scheduling Request on said allocated resources.

The apparatus may further comprise means for, on expiry of said timer, cancelling said Scheduling Request.

The apparatus may further comprise means for, if said timer expires, on expiry of said timer, cancelling all of said Scheduling Requests that are currently pending.

The apparatus may further comprise means for, prior to initiating said timer, receiving from a network apparatus configuration information for setting the length of the timer, and means for setting the length of the timer in response using the configuration information.

The apparatus may further comprise means for configuring the timer to apply to a single logical channel or logical channel group.

Said timer may be configured to expire at the next opportunity for transmitting a random access preamble to a network apparatus.

The apparatus may further comprise means for initiating a time-alignment timer, wherein expiry of the time-alignment timer indicates that the network apparatus is no longer synchronised on the uplink with the apparatus initiating the timer-alignment timer, means for, on expiry of said timer, determining whether the time-alignment timer has expired, and means for only performing said initiating of a random access procedure when it is determined that the time-alignment timer has not expired.

The apparatus may further comprise means for initiating a timer in respect of each Scheduling Request to be transmitted, and means for, on the first expiry of one of said timers, resetting the remainder of said timers and initiating random access procedures.

The apparatus may further comprise means for configuring said timer to expire on the next random access channel subframe to occur subsequent to initiation of said timer.

The apparatus may further comprise means for configuring said timer to expire on the next random access channel subframe to occur subsequent to initiation of said timer that is associated with one of: the serving beam; the beam having the best quality; a candidate beam; and/or a beam group.

The apparatus may comprise means for configuring said timer in dependence on a window of time within which a user apparatus is configured to expect a network to assign uplink resources for transmitting a scheduling request.

The apparatus may further comprise: means for receiving an allocation of resources for an uplink channel prior to expiry of said timer; and means for pausing said timer at the value of the timer when the resource allocation is received.

The apparatus may further comprise: means for transmitting a Scheduling Request in the allocated resources; and means for resuming the count of the timer from the paused value of the timer.

The apparatus may further comprise: means for transmitting a Scheduling Request in the allocated resources; and means for restarting the count of the timer from an initial value of the timer.

The apparatus may further comprise: means for restarting and/or resuming the count of the timer when the Scheduling Request is transmitted; and/or means for restarting and/or resuming the count of the timer a predetermined time after transmitting the Scheduling Request.

According to a fourth aspect, there is provided an apparatus comprising: means for determining a timer value for delaying an initiation of a random access procedure at a user apparatus; and means for signalling the timer value to the user apparatus.

The determining may be made aperiodically in dependence on network conditions within a preceding time period.

According to a second aspect, there is provided a method comprising: determining, by a network apparatus, a timer value for delaying an initiation of a random access procedure at a user apparatus; and signalling, by the network apparatus, the timer value to the user apparatus.

The determining may be made aperiodically in dependence on network conditions within a preceding time period.

According to a fifth aspect there is provided an apparatus comprising at least one processor, and at least one memory comprising code that, when executed by the at least one processor, causes the apparatus to: determine that there are no uplink resources available for transmitting a Scheduling Request; initiate a timer in response to said determination; and if said timer expires, on expiry of said timer, initiate a random access procedure on the uplink.

The apparatus may further be caused to receive an allocation of resources for an uplink channel prior to expiry of said timer and transmit the Scheduling Request on said allocated resources.

The apparatus may be caused to, on expiry of said timer, cancel said Scheduling Request.

The apparatus may further be caused to, if said timer expires, on expiry of said timer, cancel all of said Scheduling Requests that are currently pending.

The apparatus may further be caused to, prior to initiating said timer, receive from a network apparatus configuration information for setting the length of the timer, and set the length of the timer in response using the configuration information.

The apparatus may further be caused to configure the timer to apply to a single logical channel or logical channel group.

Said timer may be configured to expire at the next opportunity for transmitting a random access preamble to a network apparatus.

The apparatus may further be caused to initiate a time-alignment timer, wherein expiry of the time-alignment timer indicates that the network apparatus is no longer synchronised on the uplink with the apparatus initiating the timer-alignment timer, on expiry of said timer, determine whether the time-alignment timer has expired, and only perform said initiating of a random access procedure when it is determined that the time-alignment timer has not expired.

The apparatus may further be caused to initiate a timer in respect of each Scheduling Request to be transmitted, and on the first expiry of one of said timers, reset the remainder of said timers and initiate random access procedures.

The apparatus may further be caused to configure said timer to expire on the next random access channel subframe to occur subsequent to initiation of said timer.

The apparatus may further be caused to configure said timer to expire on the next random access channel subframe to occur subsequent to initiation of said timer that is associated with one of: the serving beam; the beam having the best quality; a candidate beam; and/or a beam group.

The apparatus may be caused to configure said timer in dependence on a window of time within which a user apparatus is configured to expect a network to assign uplink resources for transmitting a scheduling request.

The apparatus may be further configured to: receive an allocation of resources for an uplink channel prior to expiry of said timer; and pause said timer at the value of the timer when the resource allocation is received.

The apparatus may be further configured to: transmit a Scheduling Request in the allocated resources; and resume the count of the timer from the paused value of the timer.

The apparatus may be further configured to: transmit a Scheduling Request in the allocated resources; and restart the count of the timer from an initial value of the timer.

The apparatus may be further configured to: restart and/or resume the count of the timer when the Scheduling Request is transmitted; and/or restart and/or resume the count of the timer a predetermined time after transmitting the Scheduling Request.

According to a sixth aspect, there is provided an apparatus comprising at least one processor, and at least one memory comprising code that, when executed by the at least one processor, causes the apparatus to: determining a timer value for delaying an initiation of a random access procedure at a user apparatus; and means for signalling the timer value to the user apparatus.

The determining may be made aperiodically in dependence on network conditions within a preceding time period.

A computer program comprising program code means adapted to perform the herein described methods may also be provided. In accordance with further embodiments apparatus and/or computer program product that can be embodied on a non transitory computer readable medium for providing at least one of the above methods is provided.

It should be appreciated that any feature of any aspect may be combined with any other feature of any other aspect.

Various other aspects and further embodiments are also described in the following detailed description of examples embodying the invention and in the attached claims.

FIGURES

Some embodiments will now be described in further detail, by way of example only, with reference to the following examples and accompanying drawings, in which.

DETAILED DESCRIPTION

In general, the following disclosure relates to Scheduling Requests. A Scheduling Request is used by a user apparatus for requesting uplink channel resources for the transmission of new data. In particular, uplink shared channel resources may be requested. In the LTE system, a medium access control (MAC) layer of a user apparatus triggers the transmission of a Scheduling Request when data becomes available for transmission in the uplink (in a more detailed form, in LTE, a Scheduling Request is triggered for transmission when a buffer status report is triggered by the new availability of data for transmission in the uplink and the user apparatus does not have any uplink resources assigned for the transmission of the data).

A Scheduling Request may be transmitted via an uplink transmission in a number of different ways. However, if no resources have been assigned to the user apparatus for transmitting the Scheduling Request, then the user apparatus may transmit the Scheduling Request using a random access procedure. To transmit a Scheduling Request using a random access procedure, a user apparatus selects a random access preamble sequence from a set of sequences for transmission on a random access channel. If another user apparatus selects the same preamble sequence (and similarly transmits it on the random access channel), the network apparatus receiving this data may reserve the same resources for both user apparatuses. This may be resolved through later communications between the user apparatuses and the network apparatus. However, at least one of the user apparatuses must re-initiate the random access procedure as a result of this contention resolution.

The inventors have realised that a random access procedure is not always the most efficient way of transmitting a Scheduling Request, as it increases the latency of the system overall. Therefore, the following proposes a system in which the initiation of a random access procedure for transmitting a Scheduling Request is delayed (and, in some cases, cancelled). Such a mechanism may be used to improve the latency of the system, reduce the power consumption of the user apparatus, increase the resource efficiency and decrease the Random Access Channel load.

Figure 1:
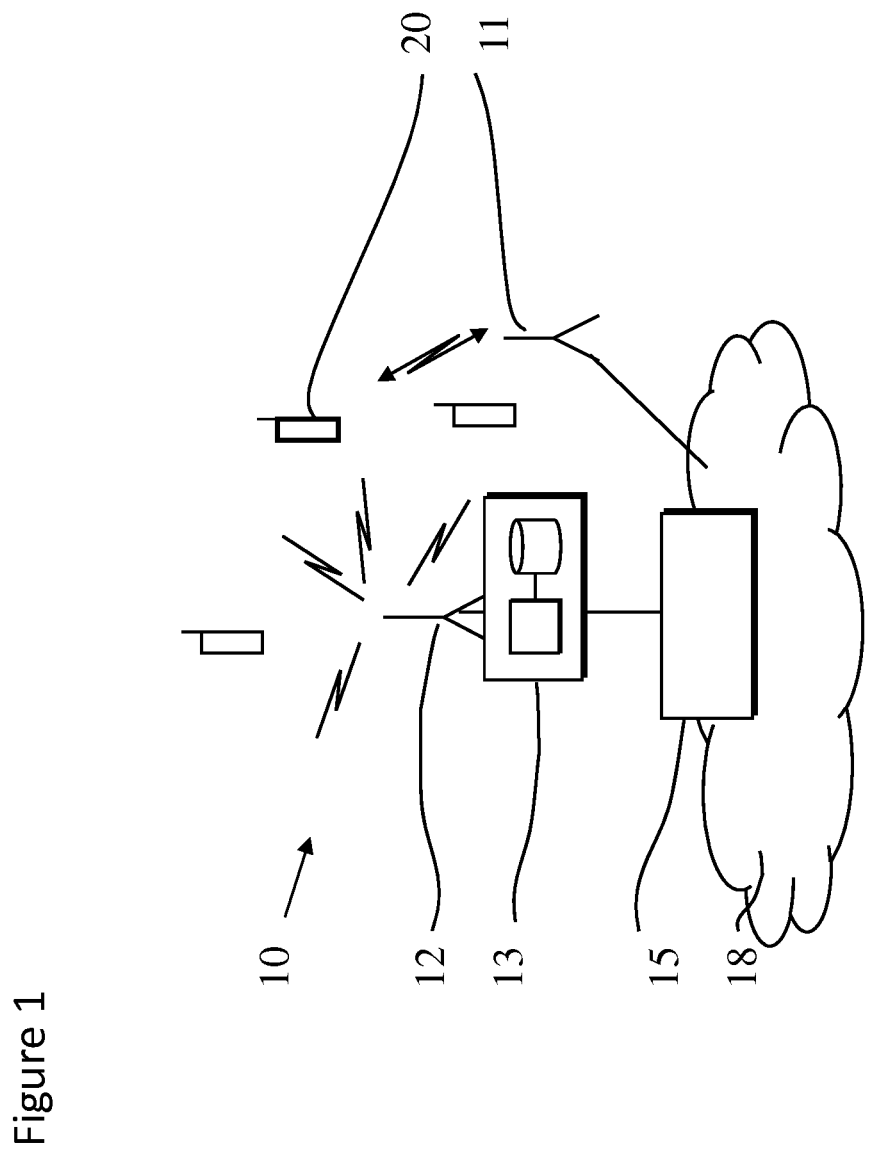
FIG. 1 shows a schematic example of a system where the invention may be implemented.

In the following certain exemplifying embodiments are explained with reference to a wireless communication system serving devices adapted for wireless communication. Therefore, before explaining in detail the exemplifying embodiments, certain general principles of a wireless system, components thereof, and devices for wireless communication are briefly explained with reference to system 10 of FIG. 1, device 20 of FIG. 2 and control apparatus thereof, to assist in understanding the described examples.

A communication device can be used for accessing various services and/or applications provided via a communication system. In wireless communication systems the access is provided via a wireless access interface between wireless communication devices and an appropriate access system. A device may access wirelessly a communication system via a base station. A base station site can provide one or more cells of a cellular system. In the FIG. 1 example, a base station 12 can provide e.g. three cells on different carriers. In addition to the base station 12, at least one serving cell can also be provided by means of another station or stations. For example, at least one of the carriers may be provided by a station that is not co-located at base station 12. This possibility is denoted by station 11 in FIG. 1. Interaction between the different stations and/or controllers thereof can be arranged in various manners. Each communication device 20 and base station may have one or more radio channels open at the same time and may receive signals from more than one source.

A base station may have a control apparatus 13 and/or may be connected to a controller which has the control apparatus. In the latter case, the controller may serve a plurality of base stations.

A base station node can be connected to a data network 18 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

A communication device can access a communication system based on various access techniques, for example those based on the third Generation Partnership Project (3GPP) specifications. A non-limiting example of mobile architectures is known as the Evolved Universal Terrestrial Radio Access Network (E-UTRAN). A non-limiting example of base station of a cellular system is what is termed as a NodeB or enhanced NodeB (eNB) or next generation NodeB (gNB) in the vocabulary of the 3GPP specifications. References in the following to any of these base station types will be considered to also reference at least these other forms of base station. The eNBs may provide E-UTRAN features such as user plane Radio Link Control/Medium Access Control/Physical Layer Protocol (RLC/MAC/PHY) and control plane Radio Resource Control (RRC) protocol terminations towards mobile communication devices.

Figure 2:
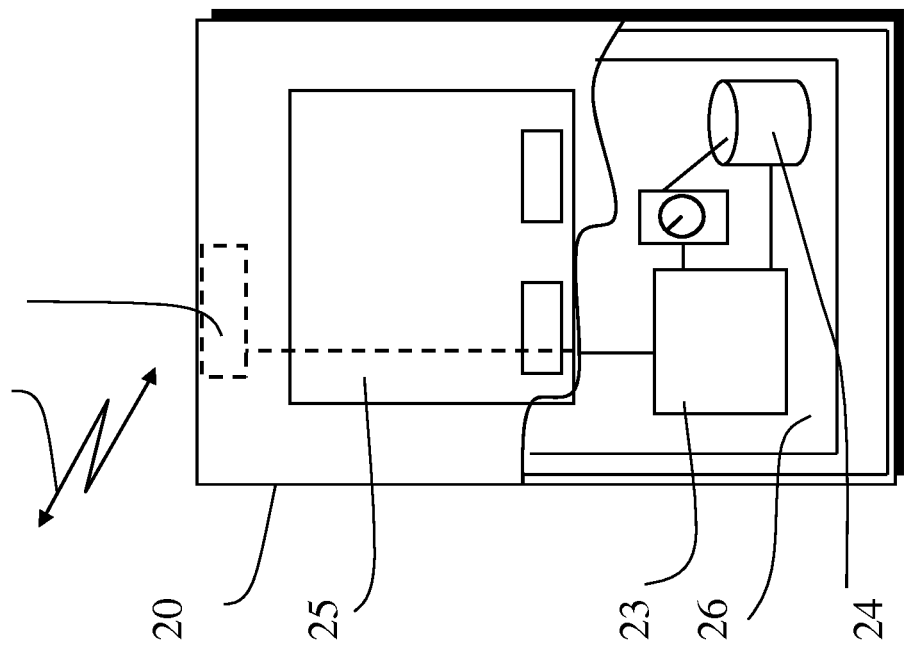
FIG. 2 shows an example of a communication device.

FIG. 2 shows a schematic, partially sectioned view of a communication device 20 that a user can use for communications. Such a communication device is often referred to as user equipment, user apparatus or terminal. Throughout the following, the term user apparatus will be used. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A communication device is typically provided with at least one data processing entity 23, at least one memory 24 and optionally other possible components for use in software and hardware aided execution of tasks it is designed to perform, including control of access to and communications via base stations and/or other user terminals. The data processing, storage and other relevant control apparatus can be provided on an appropriate circuit board and/or in chipsets and/or in one or more integrated circuits. This apparatus is denoted by reference 26.

Various functions and operations of a communications device are arranged into layers in accordance with a hierarchical model. In the model lower layers report to higher layers and receive instructions therefrom.

A user may control the operation of the device 20 by means of a suitable user interface such as key pad, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus may be provided with cognitive radio capability. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

As mentioned above, when a user apparatus wishes to transmit data on the uplink to a network apparatus, and no resources are available for transmitting that data, the user apparatus is configured to transmit a Scheduling Request. The Scheduling Request may thus be used to request uplink shared channel resources for the new uplink transmission. In general, the medium access control (MAC) layer of a user apparatus is configured to trigger the transmission of a Scheduling Request when a buffer status report (Buffer Status Report) is triggered and the user apparatus does not have uplink resources for transmission of at least the Buffer Status Report. The Buffer Status Report is triggered when data becomes available for transmission in the uplink. It is understood that the Scheduling Request may also be triggered without Buffer Status Triggering when data becomes available for transmission in the uplink.

Under current proposals for 5G, there are three ways in which Scheduling Requests may be made: via a Scheduling Request "sweep"; via a scheduled uplink resource; and via a Random Access procedure. These will now be discussed separately.

A Scheduling Request "sweep" refers to the use of a "sweeping subframe", which provides coverage for common control channel signalling with beam forming. It is understood that beam forming refers to signal processing techniques that may change the directionality of a transmitter and/or receiver array by changing the phase and relative amplitudes of the signals being transmitted/received by the array. Beamforming will be briefly described, prior to sweeping subframes.

Different transceiver architectures have been considered for 5G radio access system: digital, analogue and so-called hybrid architectures (which utilizes a hybrid of digital baseband processing (such as Multiple Input Multiple Output and/or digital precoding). Although some aspects of the following may be discussed in the context of analogue beamforming (fully analogue or hybrid transceiver), it should be appreciated that the described methods are also applicable for digital beamforming transceiver architecture To compensate the increased path loss when operating on higher frequencies, beamforming is seen as essential for providing cell coverage. The aforementioned transceiver architectures provide mechanisms for implementing beam forming in future systems, depending on limitations resulting from cost and complexity of their implementation. As an example, systems deployed to lower frequencies (~sub 6 GHz) may be implemented by using fully digital architecture, whilst higher frequencies (in which the number of antenna elements required for cell coverage may range from tens to hundreds) may be implemented by using a hybrid or fully analogue architecture.

A sweeping subframe comprises sweeping blocks (SB), where a single block covers a specific area of the cell (coverage area provided by a base station) through beam forming techniques. This is illustrated with respect to FIG. 3A.

Figure 3A:
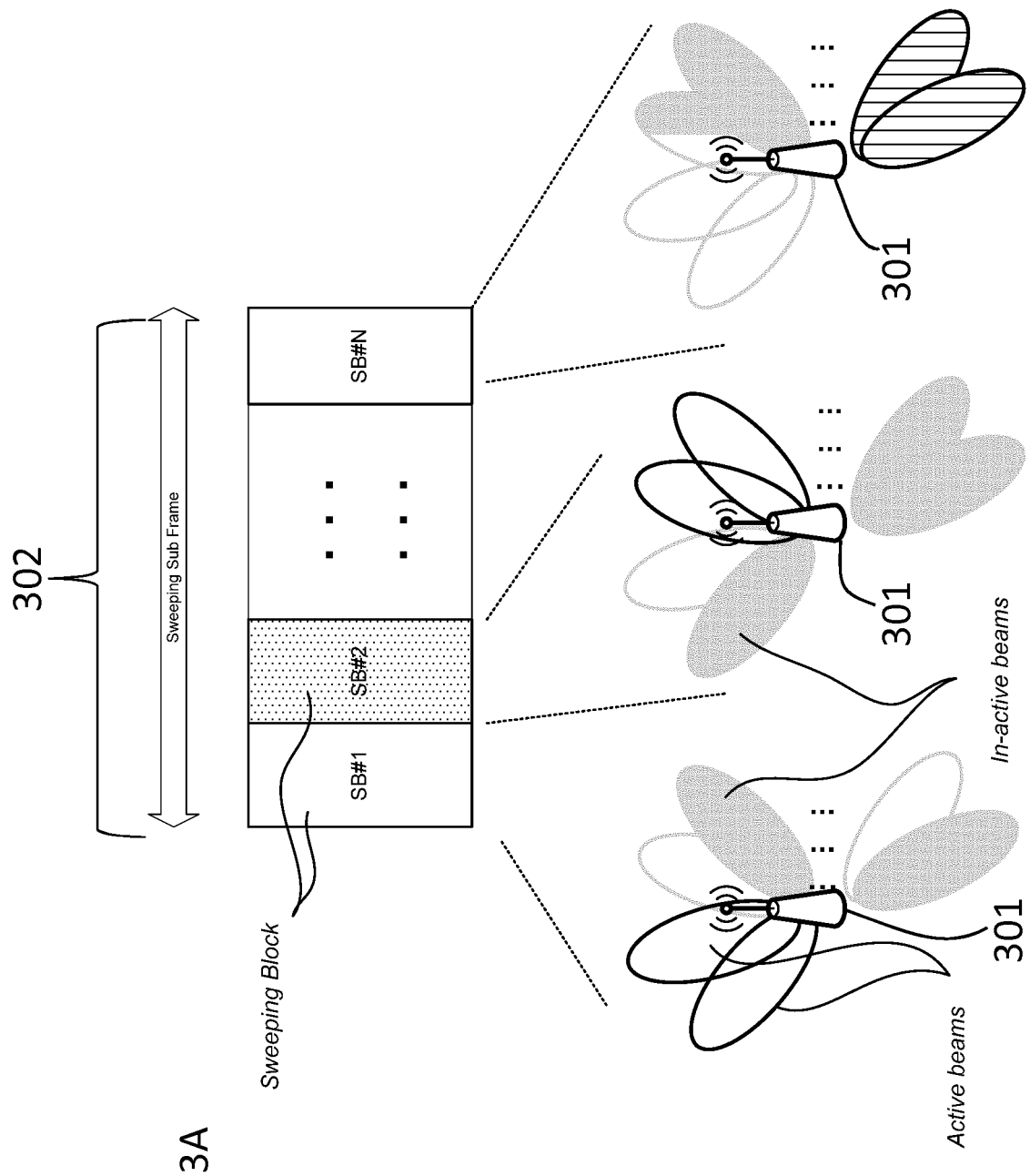
FIGS. 3A to 3C illustrate principles of beamforming.

FIG. 3A depicts a network apparatus (e.g. an eNB) 301 at three separate instances, separated by time. In the first of these instances, a pair of the beams formed by the network apparatus are "active" (i.e. transmissions are being made on them), whilst the other beams formed by the network apparatus are "inactive" (i.e. no transmissions are being made on them). These active beams form the first sweeping block SB #1 in the sweeping subframe 302. In the second of these instances, a second (different) pair of the beams is active whilst the remaining beams are inactive. This second pair of beams forms the second sweeping block SB #2 in the sweeping subframe 302. In the third of these instances, a third (different) pair of the beams is active whilst the remaining beams are inactive. This third pair of beams forms the nth sweeping block SB #n in the sweeping subframe 302. It should be noted the number of concurrently active beams depends on the network implementation and is not limited to 2 beams as illustrated.

These techniques may be applied in both the downlink and the uplink. As an example of downlink direction, downlink common control channel coverage may be provided by the sweeping sub frame. In this case, each sweeping block would carry essential cell access information, such as downlink synchronization signals, system information such as a master information block (MIB), a system information block (SIB) or the like (including Physical Random Access Channel (PRACH)/Random Access Channel (RACH) configurations), and any control information that needs to be broadcasted in a cell (such as paging). In the uplink direction the sweeping sub frame/sub frames may accommodate resources for random access channel or other uplink channels requiring periodic availability such as Scheduling Requests (as mentioned above) and sounding reference symbols. When the Scheduling Request is transmitted via a sweep, a user apparatus is configured with specific Scheduling Request resources and may be further configured with a sequence (for the cell) used by the user apparatus to indicate the availability of data for uplink transmission to the network. The configuration may apply periodically for the user apparatus, for instance, every 10 ms, 20 ms, 30 ms, etc. The Scheduling Request resources may be frequency and/or time multiplexed with the Random Access Channel resources. The Scheduling Request configuration of the user apparatus may apply on at least one sweeping block, or generally in all sweeping blocks provided in in the uplink.

In a beam formed system, in which the cell coverage is provided by multiple beams, it may be beneficial to identify a single beam e.g. by using beam specific reference signals, for enabling a user apparatus to perform beam level detection/separation and perform measurement on beam specific measurements (BRS) such as Reference Signal Received Power (RSRP), Reference Signal Received Quality (RSRQ), Received Signal Strength Indicator (RSSI), Channel Quality Indicator or the like. Identifying different beams may be beneficial. For example, when a user apparatus indicates to a network the preferred communication beam during initial access, or when mapping a measurement to a common reference index to a beam when reporting such measurements to network.

To identify a beam, the following mappings can be made. As an example, if 8 different BRS signals are transmitted per sweep block, the receiver of these beams is potentially able to measure 8 different signal indices (beams or beam indices). The same BRS signals may be reused in the next sweep block. Therefore, an identity of the sweep block needs to be determined to be able to determine the beam index. One way of calculating the beam index may be to use the following formula: Beam index=BRS index*Sweep block index. The sweep block index may be explicitly signalled if the sweep block (sweep symbol or multiple symbols) also conveys information (such as the master information block, the system information block, downlink control, downlink data, etc). Another mechanism for identifying the sweep block may include the use of a specific sequence to identify the block.

A user apparatus may perform BRS signal level measurements on downlink sweep on 5G Node B communication beams (detected BRS signals) and report the measurement results to 5G Node B. Alternatively or additionally, the network may send additional reference signals for the user apparatus to measure and provide feedback on. These reference signals may be, for example, so-called beam refinement signals (BRRS signals). Depending on the measured signals, different feedback may be provided for BRS and BRRS measurements. For example, BRS measurements may be performed on the beam reference signals, which can be directly associated by user apparatus to specific beam index while the BRRS measurements may be performed on specific beam reference signals, where the beams used to send the signals may not be known at the user apparatus side. The 5G Node B is able to map the reported measurement results on each reference signal to actual beam indices.

The user apparatus may feedback the measurement results by using physical layer signaling (e.g. the physical uplink control channel) or higher layer signaling such as Layer 2 (medium access control layer) or Layer 3 (Radio Resource Control layer) by transmitting a beam report, such as a BSI report (Beam State Information). A BSI report may include information such as Beam Index—Beam RSRP (RSRQ) of all detected beams or N highest quality beams. The BSI report format may be limited by the used signaling mechanism (e.g. the physical uplink control channel), which may limit the number of bits in the report to a fixed number, or to a control element length in a medium access control part of the signaling (flexibility determined by the grant size). Also, depending on the measurement type e.g. whether the measurement was made on BRS or BRRS (or the like), the report format may be different. For example, when measuring BRS signals, the user apparatus may explicitly detect the beam indices that it measures, whereas in case of BRRS measurements, the user apparatus may only use logical index of detected beam specific reference signals. The report of BRRS measurements may be referred as BRI (Beam Refinement Information). The beam index space of BSI and BRI may differ in size.

In some scenarios e.g. in inter-cell mobility reporting, the user apparatus may also feedback the Cell ID to provide context to the beam level measurements.

On higher frequencies, in addition to 5G Node B beamforming, the user apparatus may also use beamforming. The user apparatus may need to steer or otherwise form its received beam to multiple directions to determine a desired (or highest) quality beam/direction for communication. The user apparatus may measure several receive directions, and determine which direction provides the highest quality of communication based on the predefined metrics. Such metrics may include, for example, a receive direction that detected the highest RSRP of the 5G Node B beam(s) and/or which receive direction detected highest number of beams above a specific quality threshold.

As the 5G Node B beam radiation patterns typically overlap (e.g. due to design to provide coverage, due to reflecting radio environment, and/or due to detecting a side lobe of another beam), the user apparatus may be configured to detect multiple beams per receive direction. The user apparatus may then associate the detected 5G Node B beams per the RX direction of each beam. The user apparatus may thus group 5G Node B beams to multiple groups. In one example, a special case is where user apparatus maintains a group of 'one' so that one 5G Node B beam is associated to one user equipment receive beam. In one example, one beam in the group may be a beam with a highest quality (e.g. a highest RSRP) measured by the user apparatus.

Figure 3B:
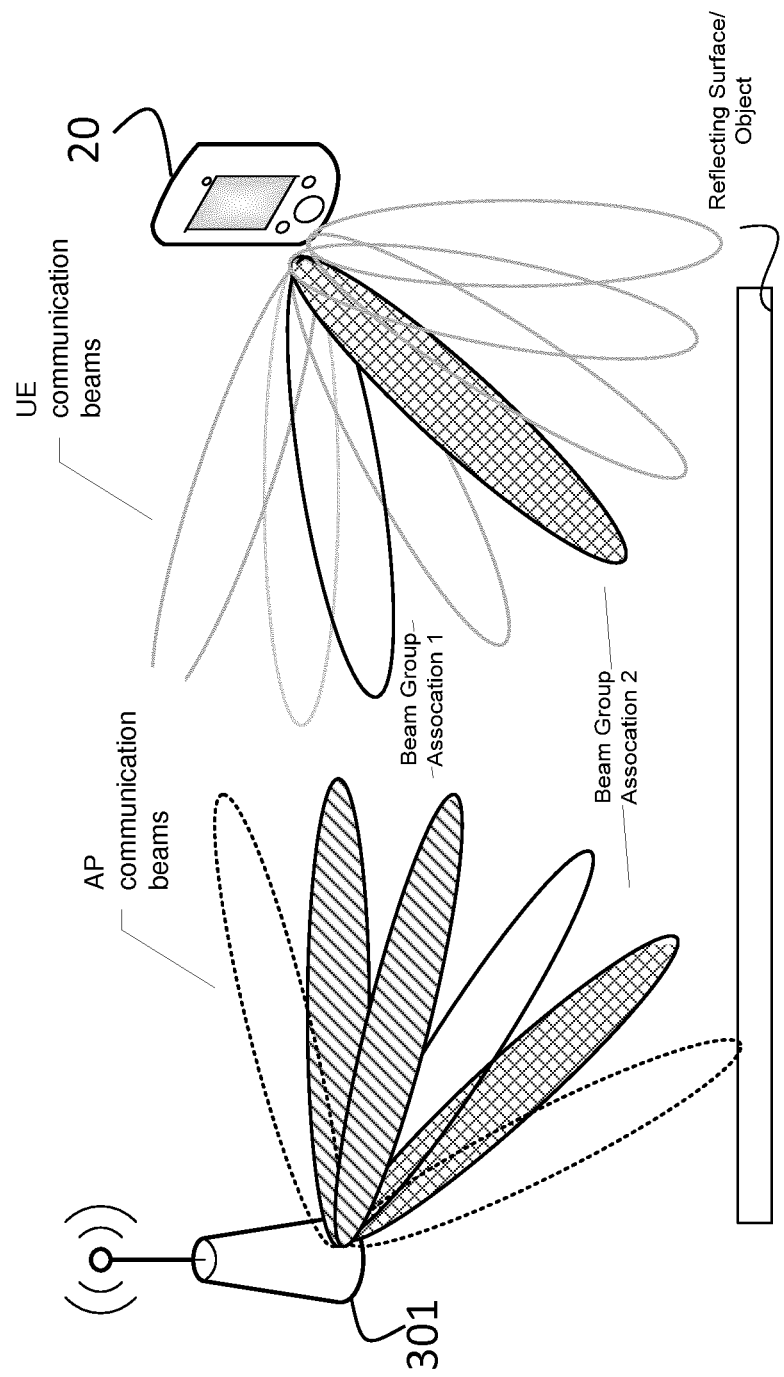
Figure 3C:
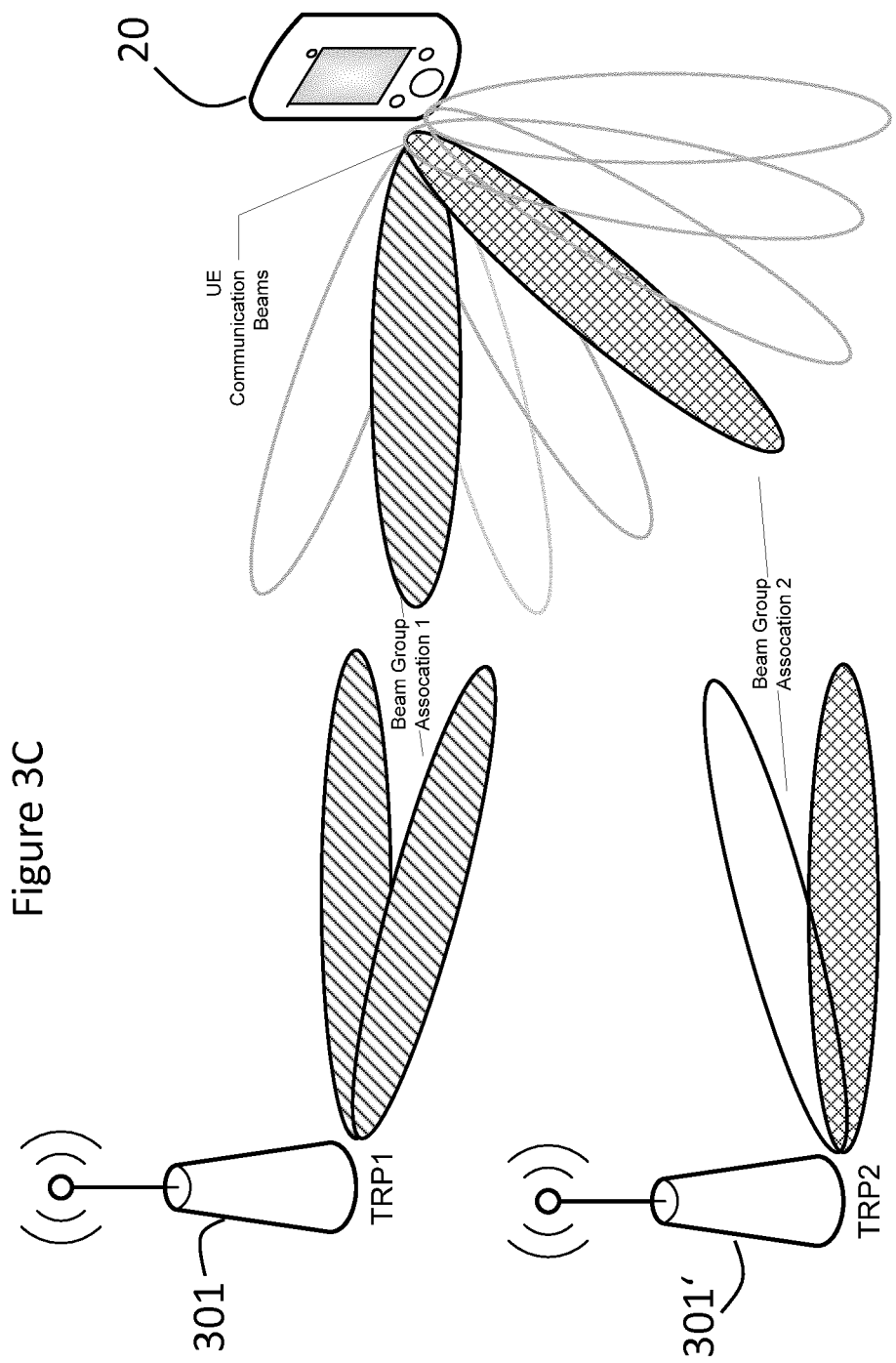

FIG. 3B illustrates beam grouping on a high level. Based on the BRS measurements by different sets of receive beams, a user apparatus is configured to determine an association between sets of 5G-NB beams, per the receive direction of each beam. In the event that a user apparatus is able to form multiple beams concurrently, the user apparatus may group the detected 5G Node B beams per receive direction as one group. FIG. 3B illustrates this grouping example by using a so called grid-of-beams. However, in one example a user apparatus may also form alternative beam radiation patters (wider/narrower) and thus the user apparatus may be configured to detect different amounts of 5G Node B beams with a reduced beamforming gain. FIG. 3C further illustrates same example as FIG. 3B, but with non-collocated transmission reception points (in FIG. 3B, the transmission reception points may be collocated or a single transmission reception points may be used).

The second way of transmitting of Scheduling Requests is to use scheduled uplink resources. This may be performed using assigned uplink control channel resources and/or using assigned uplink shared channel resources. For example, a network apparatus may have assigned resources to a particular user apparatus on the physical uplink control channel for transmitting the Scheduling Request. As another example, the network may be configured to schedule a user apparatus with uplink shared channel resources. In this case, a transmitted Buffer Status Report may be used as a Scheduling Request unless the received uplink shared channel resources can be used to transmit all of the data in the uplink buffer of the user apparatus. In another example, a network apparatus may dynamically schedule a Scheduling Request resource in the uplink sweeping subframe. The network may be configured to schedule at least one of the above-mentioned resource types during downlink control and/or data transmission to the user apparatus. The indicated resources may indicate uplink resources to use for Hybrid-Automatic Repeat Request feedback, with the Scheduling Request being piggybacked to these resources. The network may also schedule the physical uplink control channel resources without a downlink resource block allocation (and without any other reporting). This implicitly means that the indicated resource(s) is only a scheduling resource that is available for a user apparatus to signal a Scheduling Request. As an alternative to an implicit assignment, the network may schedule explicitly the said Scheduling Request resource in the physical uplink control channel resources.

The third way of transmitting Scheduling Requests is to use a Random Access procedure. This may be used when a user apparatus is not configured with either of the other two mechanisms. In an example, when data for uplink transmission is received in an uplink buffer for transmission and no resources are available for either transmitting the Scheduling Request (e.g. on a control channel) or the data itself (e.g. on a shared or dedicated transport channel), the user apparatus automatically triggers a random access procedure.

Item 5.4.4 of Verizon's 5G.321 publication details a potential operation of the Scheduling Request procedure in 5G. This procedure is detailed below. It is understood that although some aspects of the following relate to 5G and/or LTE operations, that the presently described techniques are not limited to these systems. In particular, the presently described techniques may be applied to other systems in which transmission on the random access channel is used as a default option for transmitting data.

According to the above-mentioned publication, when a Scheduling Request is triggered, the Scheduling Request is considered as pending until it is cancelled. All pending Scheduling Request(s) are cancelled when a MAC Protocol Data Unit (protocol data unit) is assembled by the MAC layer of a user apparatus or when the uplink grant(s) can accommodate all pending data available for transmission. The MAC protocol data unit includes a Buffer Status Report which contains buffer status up to (and including) the last event that triggered a Buffer Status Report.

If a Scheduling Request is triggered and there is no other Scheduling Request pending, the MAC layer of the user apparatus sets a counter, known as the SR_COUNTER, to 0.

As long as one Scheduling Request is pending, the MAC layer of the user apparatus shall, for each transmission time interval:
  if no uplink shared channel resources are available for a transmission in this transmission time interval:
    if the MAC layer of the user apparatus has no valid resource for a Scheduling Request configured in any transmission time interval, initiate a Random Access procedure on the Serving Cell and cancel all pending Scheduling Requests (as mentioned above, resources for a Scheduling Request may be configured either via the physical uplink control channel or the physical random access channel)
    else if the 5G-MAC entity has a valid resource for the Scheduling Request configured for this transmission time interval:

if SR_COUNTER<dsr-TransMax (where dsr-TransMax represents a maximum number of transmissions of the Scheduling Request using a first assigned set of resources):
   increment SR_COUNTER by 1;
   instruct the physical layer of the user apparatus to signal the Scheduling Request on the resource for Scheduling Request configured;
else:
   notify the radio resource control of the user apparatus to release Scheduling Request and Sounding reference signal resources for all serving cells;
   initiate a Random Access procedure on the Serving Cell and cancel all pending Scheduling Requests.

The inventors have realized that, when the UE is not configured with periodic resources for transmitting a Scheduling Request via Scheduling Request sweep (which is likely to be the case in an initial phase of the 5G system), according to the above-mentioned specification, the UE will normally trigger Random Access procedure based Scheduling Request. This is because the use of Scheduling Request via scheduled resources on the physical uplink control channel or Scheduling Request sweep cannot be used unless the network proactively schedules the Scheduling Request via the physical uplink control channel or by configuring a Scheduling Request sweep far in advance, which is not always possible.

Figure 4:
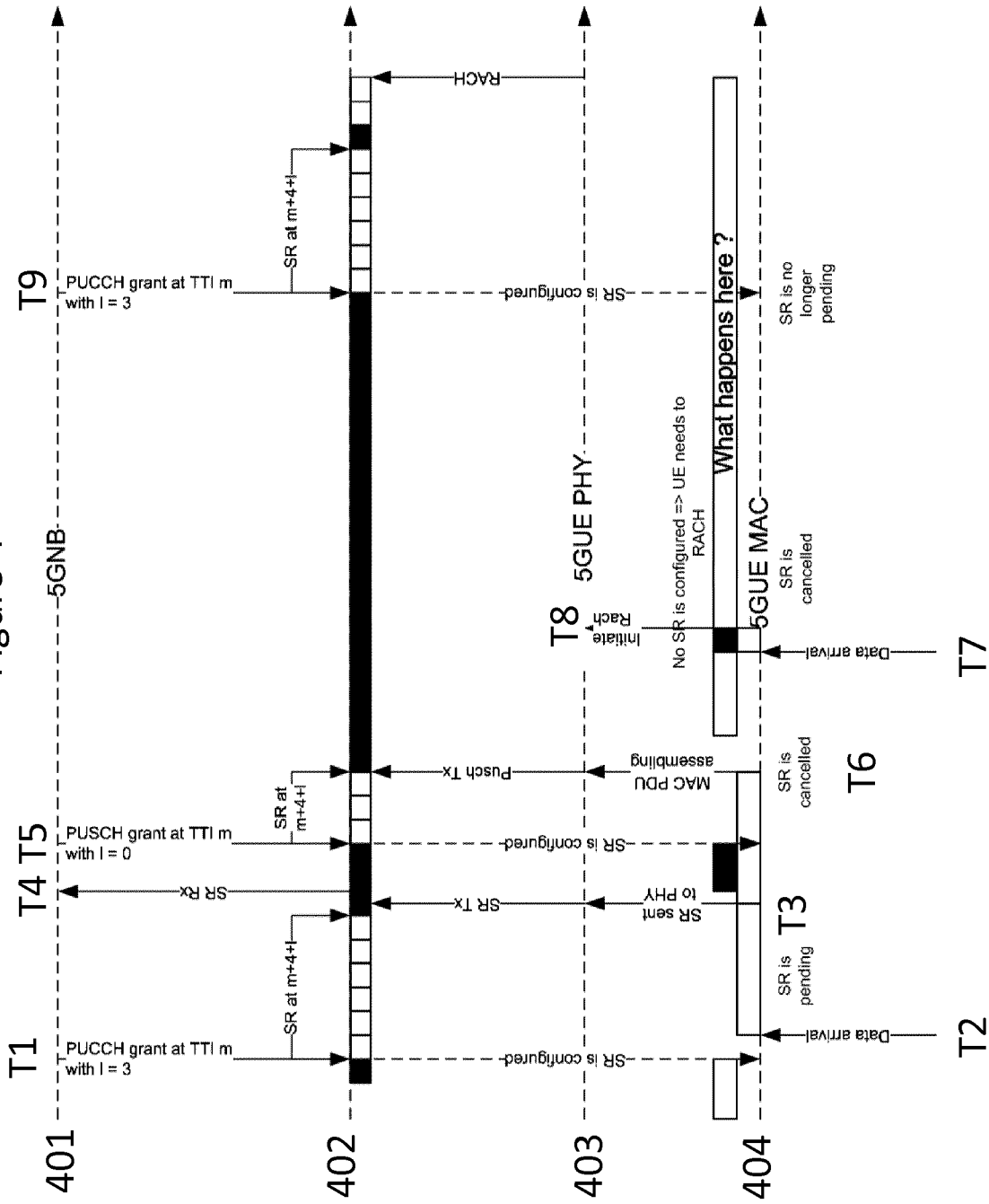
FIG. 4 illustrates Scheduling Request transmission.

This situation is illustrated with respect to FIG. 4. In FIG. 4, there is shown a top line 401 representative of an interface of a 5G Node B. Below this line, there is located a number of slots 402, representative of time slots for transmissions made between a user apparatus and the 5G Node B. Below this line of slots, there is located a line (403) representative of a physical layer interface of a 5G user apparatus. Below this line, there is a line (404) representative of an interface of medium access control layer of a 5G user apparatus. Lines extending between lines 401 to 404 represent signalling between these lines/layers/entities 401-404.

At time T1, the network 5G Node B signals a physical uplink control channel grant at transmission time Interval m to the MAC layer 404 of the user apparatus. Therefore the MAC layer 404 has a Scheduling Request configured.

At time T2, data arrives in an uplink buffer of the user apparatus. The MAC layer 404 of the user apparatus delays sending the Scheduling Request to the physical layer 403 until the configured Scheduling Request time, T3. This Scheduling Request is received by the 5G Node B at time T4.

In response to the received Scheduling Request, the 5G Node B 401 signals at time T5 a physical uplink shared channel grant at a new time transmission interval m to the MAC layer 404 of the user apparatus. At this new time transmission time interval, at time T6, the MAC layer 404 of the user apparatus passes a MAC protocol data unit to the physical layer 403 of the user apparatus, which then transmits the data on the allocated physical uplink shared channel resources. The Scheduling Request for this transmitted data is cancelled at time T6.

At a later time T7, the MAC layer 404 of the user apparatus receives data for uplink transmission to the 5G Node B. However, as no uplink resources have been configured for transmitting a Scheduling Request, at time T8 a random access procedure for transmitting this Scheduling Request is triggered, and the Scheduling Request is subsequently cancelled.

At a later time T9, the 5G Node B 401 may again configure physical uplink control channel resources for transmitting a Scheduling Request on transmission time interval m. However, at this point, no Scheduling Request is pending, and so these configured resources may be wasted, despite the user apparatus having data for transmission in the uplink buffer.

Thus, as illustrated by FIG. 4, when the Random Access procedure is triggered, the previous Scheduling Request is no longer pending and thus the user apparatus would not indicate this Scheduling Request via any subsequently assigned physical uplink control channel resources, which affects the perceivable uplink scheduling latency.

With proactive scheduling of physical uplink control channel Scheduling Request resources, this issue may be bypassed. However, this proactive scheduling limits the network scheduler to schedule physical uplink control channel opportunity for each user apparatus within every maximum physical uplink control channel "scheduling delay". This consumes resources inefficiency as, in the worst case, no other user apparatus could be served via the same direction in beamformed systems, and some assigned resources may be wasted, which is an issue with high load use cases.

Maximum physical uplink control channel "scheduling delay" refers to the latest subframe index m that could still be used for x physical uplink control channel when scheduled in subframe n. This could be limited, for example, by maximum usable hybrid automatic repeat request process count. For instance the m could be 8 subframes and thus the network may schedule the user apparatus at least every $8^{th}$ subframe with a physical uplink control channel Scheduling Request to bypass the issue by implementation. In current 5G discussions, the physical uplink control channel subframe minimum cycle is 25 subframes (also e.g., 50, 75, and 100 subframes cycle is supported which will further increase the magnitude of the issue). Such a minimum cycle would require the network to schedule the physical uplink control channel Scheduling Request resource within the physical uplink control channel subframe cycle multiple times for the user apparatus.

The following aims to address at least one of the above-mentioned problems with the currently proposed system.

In general, the following disclosure relates to delaying the initiation of any random access procedure for transmitting a Scheduling Request relative to the above described scenario. Thus, if any physical uplink control channel resources are assigned for transmitting Scheduling Requests during this delay period, these assigned resources may be used in place of the random access procedure for transmitting the Scheduling Request. In other words, such a delay procedure allows a user apparatus to wait for possible Scheduling Request indication opportunities via the physical uplink control channel, which may reduce the uplink latency, as latency problems associated with contention resolution of the Random Access procedure may be avoided.

Figure 5:
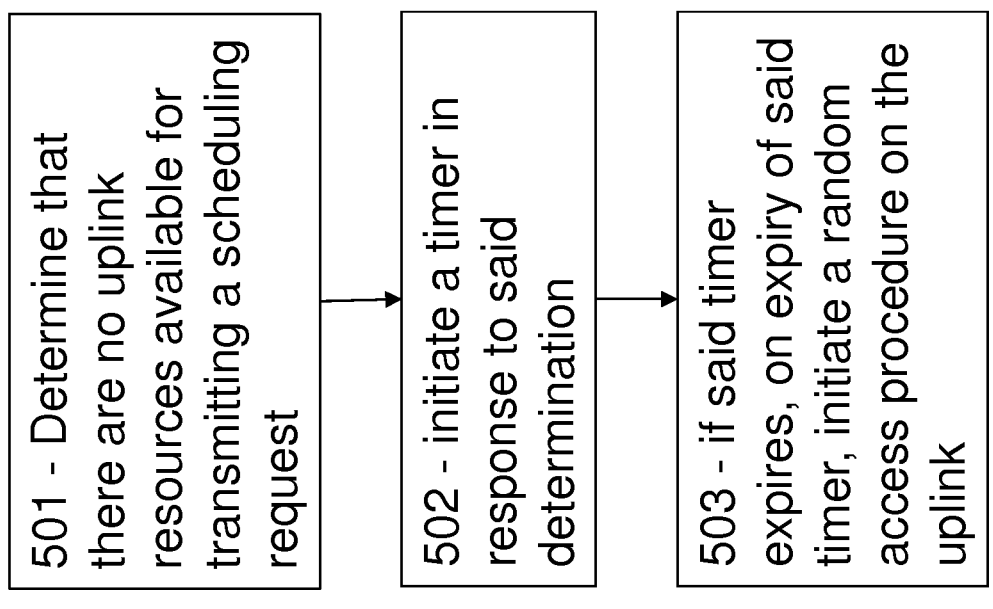
FIG. 5 is a flow diagram illustrating possible operations by a user apparatus.

Potential actions of a user apparatus are described in relation to FIG. 5. These actions may describe an algorithm that may be effected when computer code stored in at least one memory of the user apparatus is executed on at least one processor of the user apparatus. In one example, the described operations 501 to 503 are effected by the MAC layer of the user apparatus.

At 501, the user apparatus is configured to determine that there are no uplink resources available for transmitting a Scheduling Request. This determination may be made in response to a determination that the user apparatus has data to send in an uplink transmission to a network apparatus (such as an eNode B, access point, or the like). The user apparatus may determine that it has data to send in an uplink transmission (uplink data) when data arrives in an uplink buffer. The uplink buffer may be thought of a series of indications of locations in memory where data for transmission is located. In general, a Scheduling Request may be considered as a request for an assignment of uplink resources for transmitting data to a network apparatus. The Scheduling Request may be formed (or otherwise initiated) in response to a trigger message indicating that there is data to be transmitted on the uplink and not enough assigned uplink resources for transmitting this data. The trigger message may be a Buffer Status Report.

At 502, in response to the determination that there are no uplink resources available for transmitting a Scheduling Request, the user apparatus is configured to initiate a timer.

At 503, if said timer expires, the user apparatus is configured to initiate a random access procedure on the uplink on expiry of said timer. The random access procedure may cause a Scheduling Request to be transmitted. In particular, the random access procedure may comprise the transmission of a Scheduling Request on a Random Access Channel.

If the timer expires, the user apparatus may be further configured to cancel the Scheduling Request. If there are multiple Scheduling Requests pending, the user apparatus may be configured to cancel all of the Scheduling Requests that are currently pending. A Scheduling Request may be considered to be pending if it has not yet been transmitted to a network apparatus.

The user apparatus may be configured to apply the above (and following) described timing mechanisms only when uplink data is received in the uplink buffer outside of a random access channel subframe. If the uplink data is received during a subframe for transmitting data and/or a Scheduling Request, the user apparatus may be configured to automatically transmit said data and/or said Scheduling Request using said random access procedure.

A pending Scheduling Request (when there are no scheduled uplink resources for transmission of this Scheduling Request) may also be viewed as a pending random access procedure. Thus, the cancellation of a pending Scheduling Request may be viewed as the cancellation of a pending random access procedure. In one example, the random access procedure may therefore be cancelled upon the scheduling of resources on the physical uplink control channel for a Scheduling Request. In another example, the pending random access procedure may only be cancelled if the pending random access procedure was initiated by (or otherwise directly linked to) the Scheduling Request procedure. In other words, a pending random access procedure will only be cancelled subsequent to the allocation of resources for transmission of an uplink Scheduling Request if the pending random access procedure is intended for transmission of an uplink Scheduling Request.

In another example, a user apparatus may be configured to not cancel all (or any) of the pending Scheduling Request (s) until the time a subsequent physical random access channel preamble is scheduled for transmission and/or until the time a subsequent physical random access channel subframe is scheduled for transmission. The subsequent physical random access channel subframe may be a particular subframe. For example, where beamforming is used, the next physical random access channel subframe associated with a particular beam may be selected. The particular beam may be the serving beam, the best beam, a candidate beam or a beam group of the user apparatus. The particular beam may be associated with a minimum quality of service. The user apparatus may be configured to not use a beam until a minimum level of service is reached. Thus, in these last examples, the random access procedure for a user apparatus is not used for a Scheduling Request if there are insufficient beam levels available. Consequently, the timer may be reset prior to expiry if the quality of service provided by a beam falls below a minimum quality of service level threshold.

The user apparatus may be configured to receive an allocation of resources for an uplink channel prior to expiry of said timer. The uplink channel may be a physical uplink control channel. If this allocation is received prior to the expiry of said timer, the user apparatus is configured to transmit a Scheduling Request on said allocated resources.

In response to receiving the Scheduling Request, either via the random access procedure or via assigned uplink resources, the network apparatus is configured to allocate resources for transmission of the uplink data. The allocated resources for transmission of the uplink data may be assigned on the physical uplink shared channel.

The length of the timer may be set in a number of different ways. It is understood in the following that the term "length" is intended to denote a duration of the timer. In other words, the term length denotes a duration between the initiation of the timer and the expiry of the timer. The timer may expire at zero. The timer may be configured to expire at some other, non-zero, value. The timer may also be considered to be a counter, which counts either up or down to its expiry value. The count may be dependent on an actual time value (which may be maintained on a clock local to the user apparatus) or on a physical layer frame granularity such as subframe, transmission time interval, slot, or radio frame or on some other counting means (such as a number of processor cycles).

In a first example, the length of the timer may be set by a network apparatus. For example, prior to initiating the timer, the user apparatus may be configured to receive configuration information for setting the length of the timer from a network apparatus. The user apparatus may use this configuration information to set the length of the timer in response using the configuration information. The configuration information may be sent to the user apparatus by the network apparatus at only one time. The configuration information may be sent to the user apparatus by the network apparatus at multiple times. If the network configuration information is sent multiple times, the configuration information may change to take account of current and/or recent network conditions. The configuration information may be sent to the user apparatus either periodically or aperiodically, in dependence on the operation of the network device. The configuration information may be sent to the user apparatus using different protocols, such as Radio Resource Control (RRC) or Medium Access Control (MAC) protocols, or via Physical layer signalling (e.g., via Physical Downlink Control Channel/PDCCH resources) or by combination of these. For instance, the RRC layer may configure a user apparatus with different timer configurations that are activated by the MAC layer signalling option.

Figure 6:
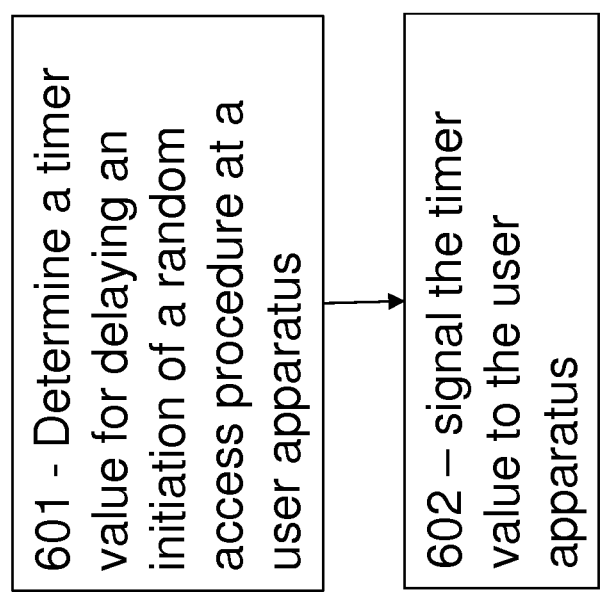
FIG. 6 is a flow diagram illustrating possible operations by a network apparatus.

The network apparatus configuration example is outlined with respect to FIG. 6. These actions may describe an algorithm that may be effected when computer code stored in at least one memory of the network apparatus is executed on at least one processor of the network apparatus.

At 601, the network apparatus is configured to determine a timer value for delaying an initiation of a random access procedure at a user apparatus.

At 602, the network apparatus is configured to signal the timer value to the user apparatus. The timer value and signalling may be as described above.

In another example, the length of the timer may be set by programming already resident in the user apparatus (i.e. without being configured by signalling from a network apparatus whilst the user apparatus is in communication with the network apparatus).

In another example, the timer may be configured as a window of time within which a user apparatus expects a network to schedule uplink resources (such as physical uplink control channel resources) for transmitting a Scheduling Request. The timer may be started and/or restarted upon each Scheduling Request opportunity, such as a physical uplink control channel Scheduling Request resource and/or a physical random access channel subframe for transmitting a Scheduling Request.

An example of when the length of the timer is set by programming already resident in the user apparatus occurs when the user apparatus is configured to set a timer to count down until a predetermined event occurs. For example, the timer may count down until the next time a physical random access channel preamble transmission is scheduled to occur and/or until the next time a physical random access channel subframe is scheduled for transmission. The length of the timer may depend on the periodicity of the random access channel availability.

It is understood that the timer may be configured to have any one of a plurality of different lengths at different times, including a length of zero (i.e. the timer may expire as soon as it is initiated). This case superficially resembles the current operational case, which automatically performs the random access procedure when there are no uplink resources available to transmit the Scheduling Request. However, the user apparatus comprises additional logic relating to the setting of the timer, and to checking the value on/expiry of the timer when data for transmission is received in the uplink buffer.

The timer may be configured to apply to a single logical channel or to a logical channel group, which may comprise at least one logical channel.

The user apparatus may be further configured to initiate a time-alignment timer. A time-alignment timer is discussed in current 5G discussion documents, and expiry of the time-alignment timer indicates that the network apparatus is no longer synchronised on the uplink with the apparatus initiating the timer-alignment timer. In other words, the expiry of a time-alignment timer indicates a point in time when a user apparatus is considered by the user apparatus (and/or the network apparatus) as no longer being synchronised on the uplink with the transmitting network apparatus. On expiry of said timer (relating to the delayed transmission of a Scheduling Request), the user apparatus may be configured to determine whether the time-alignment timer has expired. The user apparatus may be configured to only perform said initiating of a random access procedure when it is determined that the time-alignment timer has also expired. The user apparatus may be configured to only perform said initiating of a random access procedure when it is determined that the time-alignment timer has not also expired. This latter example allows for both a random access procedure and a Scheduling Request transmission via assigned physical uplink control channel resources to be run in parallel.

The timer may be stopped upon receiving an uplink resource allocation for transmitting a Scheduling Request. In other words, the value on the timer may be paused, or otherwise fixed at the value on the timer when the resource allocation is received by the user apparatus from the network apparatus. The timer may be resumed on transmission of the Scheduling Request. In other words, the timer may continue to count from its paused value to its expiry value on transmission of the Scheduling Request. The timer may be restarted on transmission of the Scheduling Request. In other words, the timer may be reset to its initial value on transmission of the Scheduling Request. The timer may be resumed and/or restarted at a time other than transmission of the Scheduling Request. For example, the timer may be resumed and/or restarted a predetermined time (greater than zero) after transmission of the Scheduling Request. The predetermined time may be set by a network apparatus and/or via programming already resident on the user apparatus. The predetermined time may be dynamically configured/determined whilst the user apparatus is in use/communicating with other devices. The predetermined time may be configured/determined whilst the user apparatus is not in active communications with other devices. The value of the predetermined time may be expressed in any time value, such as seconds, milliseconds, number of subframes, number of transmission time intervals, number of slots, number of radio frames, etc.

The timer may be configured to have a length that allows a maximum number of Scheduling Request transmissions to be made prior to the timer expiring. For example, the network may allocate a second (and any subsequent) set of uplink resources at a later time for transmitting a same Scheduling Request when the Scheduling Request is not received on a first set of resources at a first time. The same Scheduling Request may therefore be transmitted on assigned/allocated uplink resources up to a maximum number of times prior to Random Access procedures being used. The maximum number may be set by a network apparatus. The maximum number may be set by programming resident on the user apparatus. This maximum number may be converted into a time value (or equivalent) for setting an initial time on the timer (i.e. a first time from which the timer counts to the expiry value).

Although the following and the above is described in terms of a single timer, it is understood that the user apparatus may comprise a plurality of timers for effectively delaying the initiation of a random access procedure for transmitting a Scheduling Request. For example, a separate timer may be initiated in respect of each Scheduling Request to be transmitted. Each Scheduling Request may be associated with a respective set of data for transmission in the uplink. The sets of data may be stored in the same uplink buffer (where the uplink buffer may be distributed in the user apparatus) and/or the sets of data may be stored in different uplink buffers. In one example, on the expiry of a first one of said timers, the remainder of the timers in the plurality of timers may be reset, and random access procedures initiated in respect of each of the plurality of Scheduling Requests. In other words, the actions of a first one of the plurality of timers may affect the expiry time of the remaining timers. In another example, on the expiry of a first one of said timers, the remainder of the timers in the plurality of timers are not reset. Therefore, a random access procedure is only (at that time) initiated in respect of the first timer. In another example, a separate timer may be initiated with respect to each physical layer carrier/cell, different physical layer numerology, and/or different physical layer transmission time interval lengths.

In the above described section of Verizon 5G.321 relating to the Scheduling Requests, the discussion document may be amended to recite:
    if no uplink shared channel resources are available for a
        transmission in this transmission time interval:

if the MAC of the user apparatus has no valid resource for a Scheduling Request configured in any transmission time interval and a physical uplink control channel Scheduling Request timer is not running, initiate a Random Access on the Serving Cell and cancel all pending Scheduling Requests (as mentioned above, resources for a Scheduling Request may be configured either via the physical uplink control channel or the physical random access channel)

It is also understood that, as the Scheduling Request is considered pending following the arrival in an uplink buffer for transmission on the uplink, that the start (and/or restarting) of the timer (labelled as the physical uplink control channel Scheduling Request timer) may be affected by buffer status reports, which (as described above) are used to indicate the state of an uplink buffer in a user apparatus. A possible change to the description of this buffer status report is indicated below (and underlined).

The Buffer Status reporting procedure is used to provide the serving Node B with information about the amount of data available for transmission in the uplink buffers associated with the MAC at the user apparatus. The radio resource control level at the user apparatus controls buffer status reports reporting by configuring the two timers periodicbuffer status reports-Timer and retxbuffer status reports-Timer and by, for each logical channel, optionally signalling logicalChannelGroup which allocates the logical channel to an logical channel group.

For the Buffer Status reporting procedure, the MAC at the user apparatus considers all radio bearers which are not suspended (and may consider radio bearers which are suspended).

A Buffer Status Report is triggered if any of the following events occur:
  uplink data, for a logical channel which belongs to a logical channel group, becomes available for transmission in the radio link control layer of the user apparatus or in the packet data convergence protocol of the user apparatus (this latter protocol is located in the radio protocol, on top of the radio link control layer) and either: the data belongs to a logical channel with higher priority than the priorities of the logical channels which belong to any logical channel group and for which data is already available for transmission; or there is no data available for transmission for any of the logical channels which belong to a logical channel group, in which case the buffer status reports is referred below to as "Regular buffer status reports";
  Uplink resources are allocated and the number of padding bits is equal to or larger than the size of the Buffer Status Report MAC at the user apparatus plus its subheader, in which case the buffer status reports are referred to as "Padding buffer status reports";
  retxbuffer status reports-Timer expires and the MAC at the user apparatus has data available for transmission for any of the logical channels which belong to a logical channel group, in which case the buffer status reports are referred to as "Regular buffer status reports";
  periodicbuffer status reports-Timer expires, in which case the buffer status reports is referred below to as "Periodic buffer status reports".

For Regular and Periodic buffer status reports, buffer status reports are reported for each logical channel group that is configured.

For Padding buffer status reports, if the number of padding bits is equal to or larger than the size of the buffer status reports plus its subheader, report buffer status reports are generated for each logical channel group that is configured.

If the Buffer Status reporting procedure determines that at least one buffer status report has been triggered and not cancelled:
  if the MAC at the user apparatus has uplink resources allocated for new transmission for this transmission time interval: the Multiplexing and Assembly procedure is used to generate the buffer status reports MAC control element(s); the periodicbuffer status reports-Timer is either started or restarted; and the retxbuffer status reports-Timer is either started or restarted.
  If the MAC at the user apparatus does not have uplink resources allocated for new transmission for this transmission time interval: the Physical uplink control channel-Scheduling Request-timer is either started or restarted; and a Scheduling Request is triggered.

A MAC protocol data unit of the user apparatus contains, at most, one MAC buffer status report control element, even when multiple events trigger a buffer status report before the time the triggered buffer status reports can be transmitted. Where multiple buffer status reports are generated, the Regular buffer status reports and the Periodic buffer status reports have precedence over the padding buffer status reports.

The MAC at the user apparatus restarts the retxbuffer status reports-Timer upon indication of a grant for transmission of new data on any uplink shared channel.

All triggered buffer status reports are cancelled in case the uplink grant(s) in this subframe can accommodate all pending data available for transmission but the uplink grant(s) is not sufficient to additionally accommodate the buffer status reports MAC control element plus its subheader. All triggered buffer status reports are cancelled when a buffer status reports is included in a MAC protocol data unit for transmission.

The MAC at the user apparatus shall transmit at most one Regular/Periodic buffer status report in a transmission time interval. If the MAC at the user apparatus is requested to transmit multiple MAC protocol data units in a transmission time interval, it may include a padding buffer status reports in any of the MAC protocol data units which do not contain a Regular/Periodic buffer status reports.

All buffer status reports transmitted in a transmission time interval reflect the buffer status after all MAC protocol data units have been built for this transmission time interval. Each logical channel group shall report at the most one buffer status value per transmission time interval and this value shall be reported in all buffer status reports reporting buffer status for this logical channel group.

A Padding buffer status report is not allowed to cancel a triggered Regular/Periodic buffer status reports. A Padding buffer status report is triggered for a specific MAC protocol data unit only and the trigger is cancelled when this MAC protocol data unit has been built.

In the above discussions, references have been made to the determination of a length of the timer (or the like). It is understood that the various apparatuses configured to execute the above-mentioned functions (e.g. the user apparatus and/or the Node B) have some additional processing delay associated with causing the steps/functions to be performed. For example, if uplink data is received at the uplink buffer 1 ms prior to the start of a Random Access Channel subframe, this may be considered, in practice to have been received during the Random Access Channel subframe if the Medium Access Control level takes a comparable time to prepare the uplink data for transmission/ passing to the physical layer. Therefore, the processing time for causing various functions of the user apparatus to be performed (including at different layers within the apparatus) may be considered when configuring any of said timer values and/or when determining whether or not to implement the timer (e.g. when considering whether or not the data has been received within a Random Access Channel subframe). The processing time may, for any particular layer or process within the user apparatus, have a static value or a dynamic value (i.e. it may change during operation of the user apparatus).

As discussed above, it is noted that the above discussed issues are not limited to any particular communication environment, but may occur in any appropriate communication system. Some embodiments may for example be used in 4G and/or 5G, for example new radio/5G technologies or similar technologies.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. One or more of the steps discussed in relation to FIGS. 5 and/or 6 may be performed by one or more processors in conjunction with one or more memories.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to certain architectures, similar principles can be applied to other systems. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
   first determining that there are no uplink resources available for transmitting a scheduling request;
   initiating a timer in response to the first determination;
   if said timer expires, on expiry of said timer, initiating a random access procedure on the uplink;
   second determining that there are uplink resources available for transmitting the scheduling request subsequent to initiating said timer and prior to expiry of said timer; and
   transmitting the scheduling request on the uplink resources available in response to the second determination.

2. A method as claimed in claim 1, wherein the second determining comprises:
   receiving an allocation of resources for an uplink channel.

3. A method as claimed in claim 1, further comprising:
   on expiry of said timer, cancelling said scheduling request.

4. A method as claimed in claim 1, further comprising:
   if said timer expires, on expiry of said timer, cancelling all scheduling requests that are currently pending.

5. A method as claimed in claim 1, further comprising:
   prior to initiating said timer, receiving from a network apparatus configuration information for setting the length of the timer; and
   setting the length of the timer in response using the configuration information.

6. A method as claimed in claim 1, further comprising:
   configuring the timer to apply to a single logical channel or logical channel group.

7. A method as claimed in claim 1, further comprising configured said timer to expire at a next opportunity for transmitting a random access preamble to a network apparatus.

8. A method as claimed in claim 1, further comprising configuring said timer to expire on a next random access channel subframe to occur subsequent to initiation of said timer that is associated with one of: a serving beam; a beam having the best quality; a candidate beam; and/or a beam group.

9. A method as claimed in claim 1, further comprising:
   initiating a time-alignment timer, wherein expiry of the time-alignment timer indicates that the network apparatus is no longer synchronised on the uplink with an apparatus initiating the timer-alignment timer;
   on expiry of said timer, determining whether the time-alignment timer has expired; and
   only performing said initiating of a random access procedure when it is determined that the time-alignment timer has not expired.

10. A method as claimed in claim 1, further comprising:
    initiating a timer in respect of each scheduling request to be transmitted; and
    on the first expiry of one of said timers, resetting the remainder of said timers and initiating random access procedures.

11. A method as claimed in claim 1, further comprising configuring said timer in dependence on a window of time within which a user apparatus is configured to expect a network to assign uplink resources for transmitting a scheduling request.

12. A method as claimed in claim 2, comprising:
pausing said timer at the value of the timer when the resource allocation is received.

13. A method as claimed in claim 12, further comprising:
resuming the count of the timer from the paused value of the timer when the scheduling request is transmitted in the allocated resources.

14. A method as claimed in claim 12, further comprising:
restarting the count of the timer from an initial value of the timer when the scheduling request is transmitted in the allocated resources.

15. A method as claimed in claim 12, further comprising:
restarting and/or resuming the count of the timer when the scheduling request is transmitted; or
restarting and/or resuming the count of the timer a predetermined time after transmitting the scheduling request.

16. A method comprising:
determining, by a network apparatus, a timer value for delaying an initiation of a random access procedure at a user apparatus; and
signaling, by the network apparatus, the timer value to the user apparatus; wherein the random access procedure is delayed based on the timer value when the user apparatus determines that there are no uplink resources available for transmitting a scheduling request.

17. A method as claimed in claim 16, wherein the determining is made aperiodically in dependence on network conditions within a preceding time period.

18. An apparatus comprising:
at least one processor; and
at least one memory comprising code that, when executed on said at least one processor, causes the apparatus to;
first determine that there are no uplink resources available for transmitting a scheduling request;
initiate a timer in response to said first determination;
initiate a random access procedure on the uplink on expiry of said timer;
second determine that there are uplink resources available for transmitting the scheduling request subsequent to initiating said timer and prior to expiry of said timer; and
transmit the scheduling request on the uplink resources available in response to the second determination.

19. An apparatus comprising:
at least one processor; and
at least one processor; and
at least one memory comprising code that, when executed on said at least one processor, causes the apparatus to perform:
determine a timer value for delaying an initiation of a random access procedure at a user apparatus;
signal the timer value to the user apparatus; and
delay the random access procedure when the user apparatus determines that there are no uplink resources available for transmitting a scheduling request.

20. Non-transitory computer readable media comprising program instructions that, when executed on at least one processor, causes the method of claim 1 to be performed.

21. Non-transitory computer readable media comprising program instructions that, when executed on at least one processor, causes the method of claim 16 to be performed.

* * * * *